Jan. 12, 1926. 1,569,133

A. E. OSTRANDER

AIR BRAKE

Filed Dec. 15, 1921

INVENTOR:
Allen E. Ostrander
BY F. H. Gibbs
ATTORNEY.

Patented Jan. 12, 1926.

1,569,133

UNITED STATES PATENT OFFICE.

ALLEN E. OSTRANDER, OF RIDGEWOOD, NEW JERSEY, ASSIGNOR TO WESTINGHOUSE AIR BRAKE COMPANY, OF NEW YORK, N. Y., A CORPORATION OF PENNSYLVANIA.

AIR BRAKE.

Application filed December 15, 1921. Serial No. 522,596.

*To all whom it may concern:*

Be it known that I, ALLEN E. OSTRANDER, residing at Ridgewood, Bergen County, State of New Jersey, and being a citizen of the United States, have invented certain new and useful Improvements in an Air Brake, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

Numerous designs of more or less complicated apparatus have been applied to air brakes to indicate maximum piston travel. If the piston travel is too short the air pressure will be increased and if too great the pressure will be decreased thereby decreasing the efficiency of the brakes. It is important that correct piston travel be maintained at all times and equally important that inspectors may be able to determine quickly the amount of such piston travel at any time. It is desirable to accomplish the result without the addition of indicating mechanism or apparatus, both because of the possibility of derangement and because of the added expense incident to the production and application of such mechanism, or apparatus.

The present invention dispenses with all expensive or complicated mechanism designed to indicate the maximum travel of the piston at any time and provides means to indicate the instant piston travel each time the brakes are set. This is accomplished without the addition of separately movable indicator parts and without the addition of elements not essential to the operation of the brakes.

Figure 1:
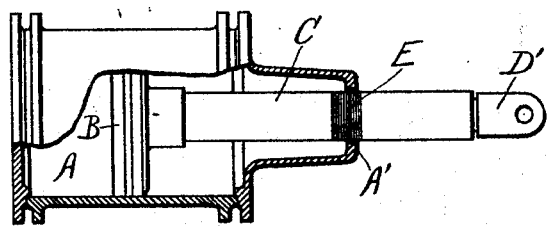
Fig. 1 is a view of the invention in side elevation partly broken away to illustrate a piston in the correct "set" position.
Figure 2:
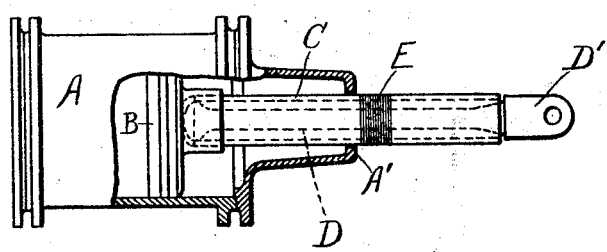
Fig. 2 is a similar view showing a slightly excessive piston travel.
Figure 3:
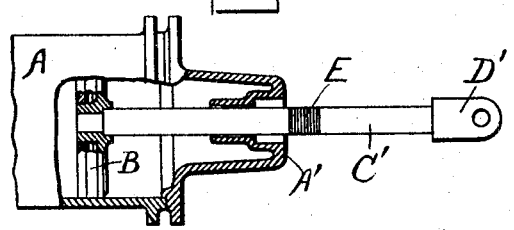
Fig. 3 is a similar view showing a modified form of combined piston rod and push rod.

Referring to the parts, A indicates the usual brake cylinder, B the piston, C the piston sleeve, D the push rod terminating in the eye bolt, D' and C' indicates a form of combined push rod and piston rod used with some types of Westinghouse brakes in which the sleeve C is omitted. The sleeve C and piston rod C' occupy substantially the same position with relation to the piston B. The target or signal E may be applied to either with the same indicating valve, in showing the instant position of the piston and for this and other reasons, it is to be understood that where I refer to "piston rod" in the claims it is to be construed as meaning either or both the sleeve C of Figs. 1 and 2 or the piston rod C' of Fig. 3. The important feature in this connection is that the signal or target E is movable with the piston and maintained at certain predetermined distance therefrom regardless of whether the target is carried by the piston rod C' or the sleeve C. It will be evident that the target E is movable to a position within the cylinder so as to be invisible when the brakes are off and is movable by and with the piston beyond the cylinder into view when the brakes are applied and the brake lever (not shown) is actuated.

The piston rod or the sleeve is the only feature of this well known assembly which is in any manner modified.

Let it be assumed that the correct piston travel, in running service of a train of cars, is eight inches and any piston travel between six inches and eight inches is permissible but that piston travel in excess of eight inches is undesirable or dangerous. The piston rod or sleeve is formed preferably of reduced diameter for a portion of its length commencing at a predetermined point or distance from the piston and for a distance of about two inches intermediate the piston B and the eye bolt D. This zone of reduced diameter is preferably painted white or any other conspicuous color so as to provide a signal or target visible beyond the end A' of the cylinder at all times when the air brakes are applied and the piston B has traveled far enough to properly set the brakes.

It will be evident that with such arrangement no additional equipment is required to show when brakes are set, as at a station and what is the instant position of the piston. In other words, with the target E properly positioned at a predetermined distance from the piston an inspector can pass down the length of a train and tell at a glance if the brake on a particular car is working properly and if the piston travel is greater or less than it should be. The target E may be formed either as an enlarged or reduced portion of the piston rod, or of a painted zone of the proper width lengthwise of the piston rod. It may be a painted zone of the same diameter as the balance of the piston or otherwise provided, the essential feature being that the target is at the proper predetermined distance from and is movable with the piston and no extra members movable independently of the piston rod are required.

What I claim is:

1. In an air brake, a cylinder, a piston movable longitudinally therein, a longitudinally movable member movable in both directions with said piston and a target on said member invisible when the piston is at a predetermined position and visible when the piston has been moved sufficiently away from such position.

2. In an air brake, a cylinder, a piston movable longitudinally therein, a member rigidly connected to said piston and movable therewith and a target on said member at such predetermined distance from the piston as to be visible only upon certain predetermined movement of said piston.

3. In a fluid pressure brake, the combination with a brake cylinder and a piston movable therein, of a member associated with said piston and provided with an indicating zone which is partly exposed when the brake cylinder piston travel is normal and is wholly exposed when the brake cylinder piston travel is excessive.

In witness whereof I have hereunto set my hand.

ALLEN E. OSTRANDER.